United States Patent [19]

Fox et al.

[11] 4,455,644
[45] Jun. 19, 1984

[54] TELECOMMUNICATION FAULT DETECTING SYSTEM

[75] Inventors: James R. Fox, Newtown, Pa.; Michael J. Horwitz, Cherry Hill, N.J.; Jay R. Charles, Doylestown, Pa.

[73] Assignee: Telesciences, Inc., Moorestown, N.J.

[21] Appl. No.: 331,206

[22] Filed: Dec. 16, 1981

[51] Int. Cl.³ ............................................. H04B 3/46
[52] U.S. Cl. ............................... 370/13; 179/175.31 R
[58] Field of Search ........................... 370/13, 14, 17; 179/175.3 F, 175.31 R

[56] References Cited

U.S. PATENT DOCUMENTS

| | | | |
|---|---|---|---|
| 3,692,964 | 9/1972 | Camiciottoli et al. | 179/175.31 R |
| 3,760,127 | 9/1973 | Camiciottoli et al. | 179/175.31 R |
| 3,917,916 | 11/1975 | Ghosh et al. | 179/175.31 R |
| 4,069,402 | 1/1978 | Mantovani et al. | 179/175.31 R |

*Primary Examiner*—Douglas W. Olms
*Assistant Examiner*—Kenneth I. Rokoff
*Attorney, Agent, or Firm*—Walter B. Udell

[57] ABSTRACT

A T-carrier digital test system which actively monitors each T-carrier wire pair on a time division multiplexing basis while either live communications or test signals are on the line, and determines from the monitored data whether an incipient or hard failure of the line exists. It achieves this result by utilization of interacting devices called Scanners and Scanner Controllers. Each Scanner is housed in a repeater case and is connected to and monitors the output of each regenerative repeater in that case. The Scanner also connects to a fault line which runs in parallel to the T-Carrier wire pair and acts as the communications media and power path between several Scanners and the telecommunications facilities at each end of the cable pair. The Scanner Controller is housed in one of the telecommunications facilities and controls and determines what tests the Scanners should perform, synchronizes the Scanners, interprets the types of errors detected by the Scanners and patterns the errors to locate a defective T-Carrier wire section and/or marginal or defective regenerative repeater. Test results may be displayed on a cathode ray tube and/or printer.

27 Claims, 8 Drawing Figures

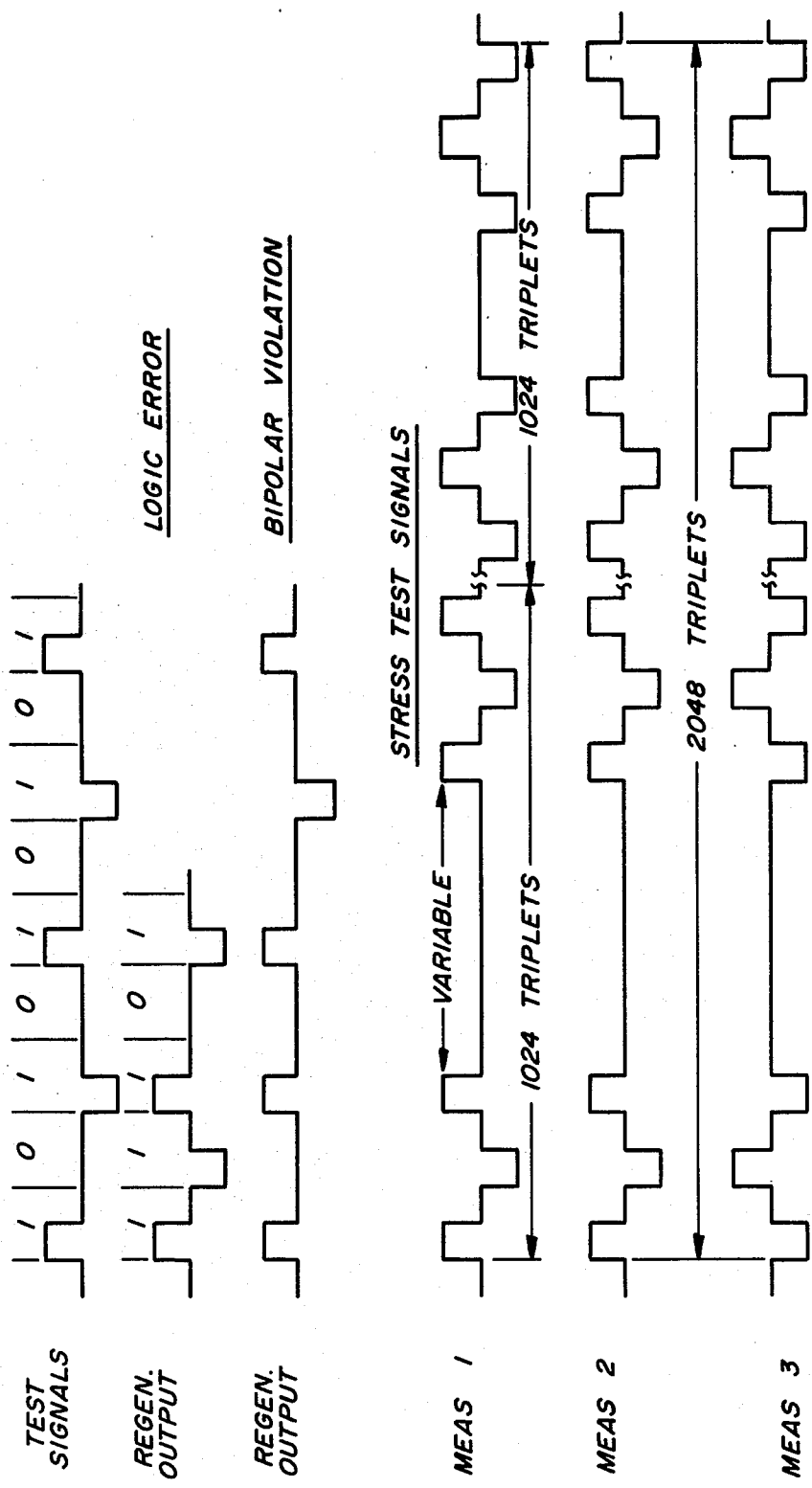

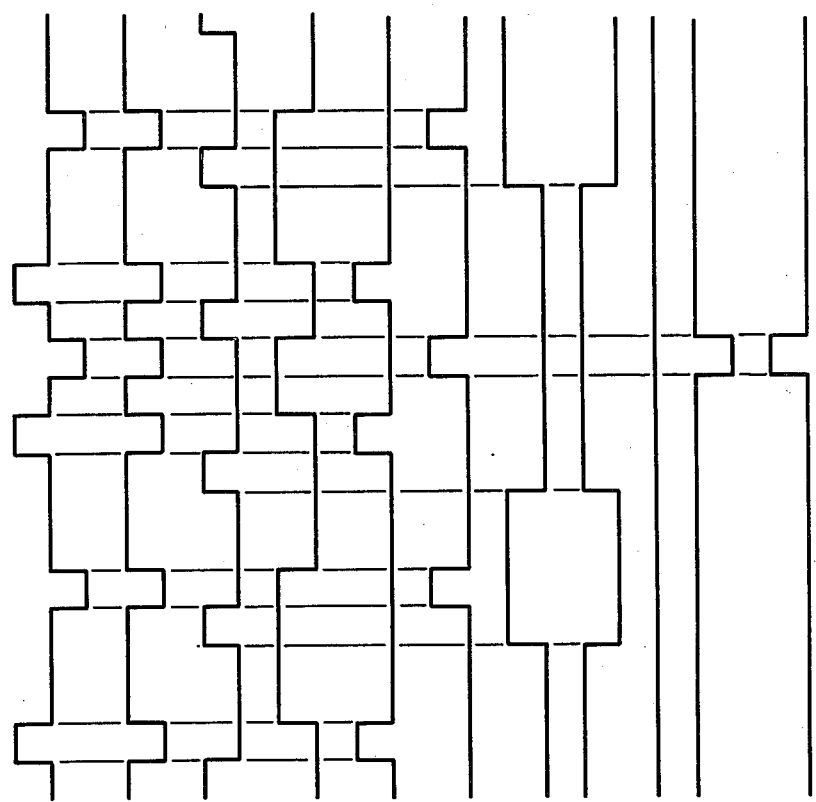

TELECOMMUNICATION FAULT DETECTING SYSTEM

This invention relates generally to T-Carrier telecommunication transmission systems, and more particularly relates to an improved system for economically detecting conditions of degraded or failed signal transmission by automatically identifying defective regenerative repeaters and broken cable leads used for the transmission of pulse code modulation (PCM). The system detects errors in live telecommunications signalling as well as in transmitted test pattern signals, and is capable of detecting signal presence, signal absence, bipolar violations, free running repeaters and logic errors.

T-Carrier is a telecommunications transmission system which uses pulse code modulation and time division multiplexing to transmit 24 voice frequency channels (or multiples of 24) over two twisted pairs of wires. The wire pairs run between two or more telecommunications facilities normally several miles apart. The signal attenuation at the T-Carrier frequencies is such that regenerative repeaters must be spaced along the wire run to reshape and amplify the signal. The regenerative repeaters are housed in repeater cases which are normally installed on telephone poles, on pedestals or in manholes with several regenerative repeaters being housed in a repeater case.

Fault locating on a digital PCM transmission line at the present time is an analog process and involves applying a complex PCM test signal which is transmitted at the line frequency rate. Live telecommunications signalling cannot be transmitted simultaneously with the test signal so that the line being tested must be removed from service. The PCM test signals contain controlled bipolar rates arranged to impress an audio frequency component on the signal. The audio frequency and amplitude output of each regenerator in the transmission line is returned to the test signal source over a fault line and compared with an expected value. The amount of variation in frequency and amplitude from that which is expected determines if the repeater is operating correctly or not. If a regenerator fails completely, the absence of an output signal will cause no audio component to be present.

The system according to the invention is not an analog system and does not test for an audio frequency and/or amplitude of a returning test signal, but instead is a digital test system which actively monitors each T-carrier wire pair on a time division multiplexing basis while live communications are on the line and determines from the monitored data whether an incipient or hard failure of the line exists. It achieves this result by utilization of devices called Scanners and Scanner Controllers which operate in conjunction with one another. Each Scanner is housed in a repeater case and is connected to and monitors the output of each regenerative repeater in that case. The Scanner also connects to a fault line which runs in parallel to the T-Carrier wire pair. This fault line acts as the communications media and power path between several Scanners and the telecommunications facilities at each end of the cable pair. The Scanner Controller is housed in one of the telecommunications facilities and controls and determines what tests the Scanners should perform, synchronizes the Scanners, interprets the types of errors detected by the Scanners and patterns the errors to locate a defective T-Carrier wire section and/or marginal or defective regenerative repeater. Test results may be displayed on a cathode ray tube and/or printer.

A primary object of the invention is to provide a telecommunications fault detecting system that requires no human intervention and no specially encoded signals to be applied to a T-Carrier facility to locate defective regenerative repeaters or broken wire leads, and which normally detects malfunctions through the continuous monitoring of live telecommunications signalling.

Another object of the invention is to provide a telecommunications fault detecting system which tests for logical errors by applying a test signal to a T-Carrier facility to stress regenerative repeaters to determine if the repeaters under varying stress levels cannot accurately reproduce an input signal.

A further object of the invention is to provide a fault detecting system as aforesaid which carries out test monitoring in a digital mode rather than in an analog mode.

Yet another object of the invention is to provide a fault detecting system as aforesaid in which a large number of communication span lines extending to a large number of different central offices can all be fault monitored from a single monitoring location.

Still a further object of the invention is to provide a fault detecting system as aforesaid in which at least some of the communication span lines are monitored from the single monitoring location through at least one other central office.

The foregoing and other objects of the invention will be more completely understood by reference to the following description in conjunction with the associated drawings, wherein:

FIG. 7 is a waveform diagram illustrating test signals utilized in testing the system in manual mode, and illustrations of a logic error and a bipolar violation; and FIG. 8 is a waveform diagram illustrating the operation of the invention in identifying logic errors.

In the several figures, like elements are denoted by like reference characters.

Figure 1:
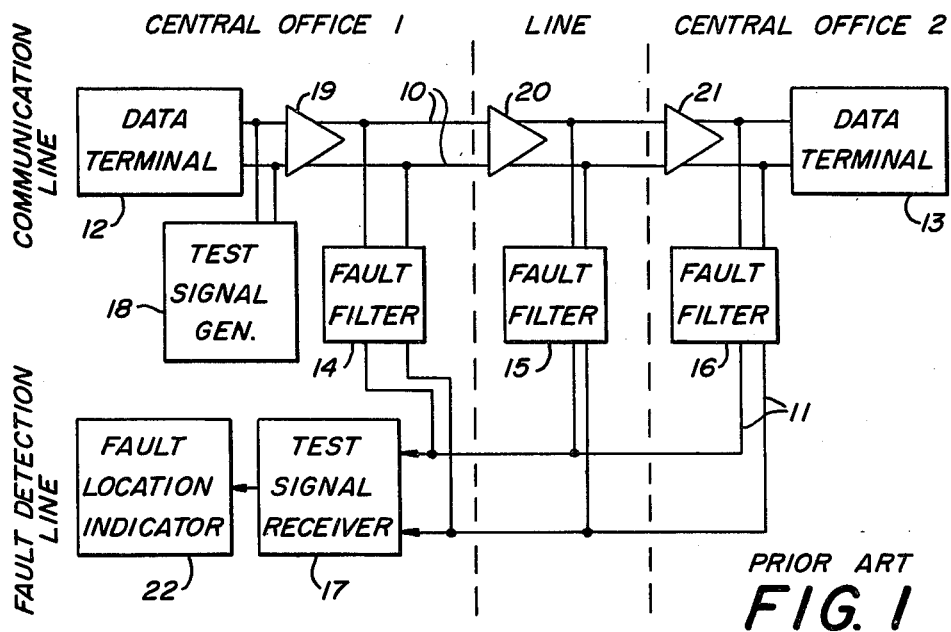
FIG. 1 is a logical block diagram of a telecommunication fault detecting system according to the known prior art.

Referring now to FIG. 1 designated as "PRIOR ART", there is shown a standardized telephone system having a communication line 10 and a fault line 11 extending between a pair of data terminals 12 and 13. The communication line is shown in one direction only, although there is also a return line, because the test generation is occurring from the terminal 12 at the left side, and with the test equipment located there, it is not possible to test out the return signal path from terminal 13. In order to check out the integrity of the transmission system from the opposite direction, a test equipment set up would have to be at terminal 13. This is not a limitation which the system according to the invention is burdened with, and in fact the present invention can test both directions between terminals 12 and 13 from the one location where the test equipment set-up is physically placed, at terminal 12 or 13 as the case may be. In this prior art system there are illustratively shown fault filters 14, 15 and 16 which monitor the communication line 10 and connect to the fault line 11, which latter returns back to a Test Signal Receiver 17.

In this prior art system when it is desired to check out the communication line, the live traffic is removed from the line and a multi-frequency test signal generator pattern, as for example from Test Signal Generator 18, is inserted onto the line. This test signal then propagates linearly down the line, and after each signal regenerator 19, 20 and 21, the respective fault filter 14, 15 or 16 associated with that regenerator picks off the particular test signal frequency to which it is tuned, and returns that frequency back to the Test Signal Receiver 17. This must be accomplished by insuring that the signal to which the first fault filter 14 is responsive must be the first signal inserted onto the communication line by the Test Signal Generator because if that regenerator 19 has failed and some other test signal frequency is put on the line first, say the signal for the second or third fault filters 15 or 16, there will be no way to determine whether in fact the regenerators 20 and 21 further down the line are functioning properly or not, because the failed first regenerator 19 will have interrupted the signal. For that reason the regenerators 19, 20 and 21 must be tested in a sequential order, the first one on the line, then the second one, then the third one, and so forth.

This testing is carried out by having separate frequencies assigned to each of the separate fault filters 14, 15 and 16, and by providing that the Test Signal Generator 18 and the Test Signal Receiver 17 respectively generate and receive the test pattern frequencies in order, namely, the frequency first for fault filter 14 then the frequency for fault filter 15, then the frequency for fault filter 16, and so on with however many fault filters there are on the line. When the Test Signal Receiver 17 detects the absence of the signal which is being looked for, it will activate a Fault Location Indicator 22 which indicates which particular regenerator and fault filter has not returned its signal, and therefore locates the failed device. Service people can then be dispatched to repair or replace the regenerator and restore service to the line. It should be understood that the communication line 10 includes a large number of line pairs each of which is monitored by the fault filter for that repeater case.

The problems with the system according to the prior art are the following. First, in order to test the communication line, it is necessary that that line be taken out of service in terms of the transmission of live traffic. Live traffic can not be transmitted at the same time that the test signal pattern is being placed on the line for test purposes. Consequently, there is line "downtime". The second problem with this system is, as previously mentioned, that the line can only be tested in one direction from a given terminal. In order to test in the opposite direction, there must be test equipment located at that other terminal, which means that either equipment has to be carted around from place to place or there must be a complete duplication of equipment at the second terminal. In both cases, this involves expense which it is desirable to avoid.

A further problem, which is also a major problem, is that the reliability of testing is not particularly high because the signal to noise ratio on the returning fault line is not particularly good. This could result in loss of a properly transmitted test signal, so that in some cases there would be an erroneous indication of a fault when in fact no fault existed. This results in the dispatch of a repair crew to a regenerator station to repair or replace a regenerator which in fact does not need service.

Additionally, on a given communication line there may be several different types of regenerators. That is, different types in terms of their impedance termination characteristics. These differences in line impedance termination characteristics cause different amplitude signals to be returned down the fault line to the Test Signal Receiver from different regenerators and can result in confusing and ambiguous data. Under such circumstances, it is possible to misidentify a regenerator which may be becoming marginal, because a properly functioning regenerator may return a lower signal than the marginal regenerator due to this line impedance characteristic, as a function of the differences in the types of regenerators on a line.

In the system according to the invention, all of the foregoing enumerated difficulties are eliminated. The system is designed to automatically isolate faulty T-Carrier line sections and defective repeaters. It continually monitors live traffic carried by each span line served by the repeaters in an apparatus case. Error counts are relayed back to the central office controller for comparison against user settable threshold levels. When a threshold is exceeded, the controller automatically triggers an alarm.

Figure 2:
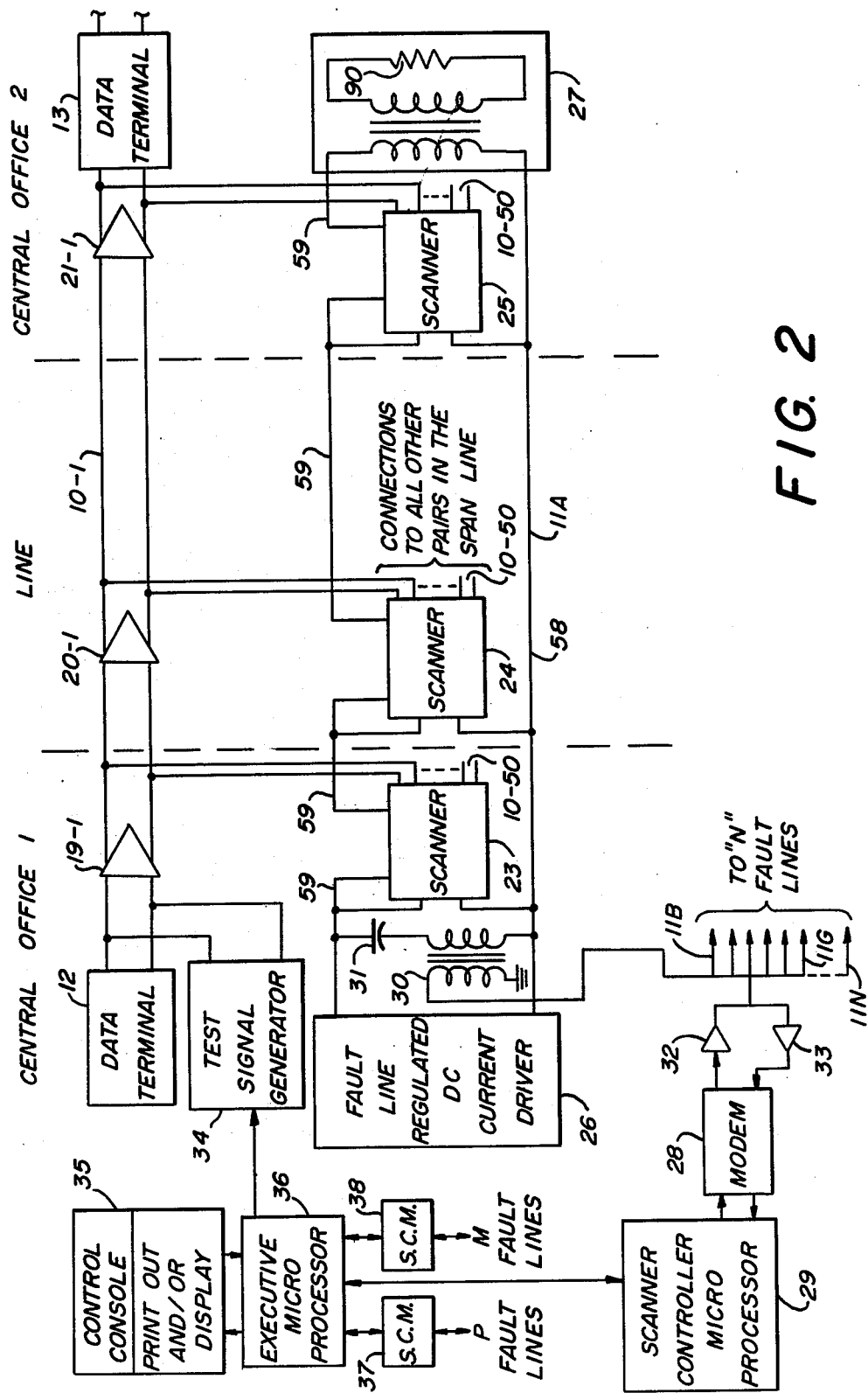
FIG. 2 is a functional block diagram of a telecommunication fault detecting system according to the invention.

FIG. 2 illustrates the basic system according to the invention, and comparison of FIG. 2 with FIG. 1 shows that several changes have been made from the prior art telephone fault line testing system. First, there still exists a communication span line 10 with its regenerators 19, 20 and 21 and the data terminals 12 and 13, as well as the fault line 11A. One line pair 10-1 of the span line 10 is shown, together with its Regenerators 19-1, 20-1 and 21-1, although it is to be understood that the span line 10 is normally composed of many such pairs. However, the fault filters 14, 15, 16 of the telephone system have been replaced by devices 23, 24, 25 called Scanners which upon instruction monitor, store and then transmit data.

Each Scanner 23, 24, 25 monitors a large number of line pairs in a span line, perhaps fifty pairs, on a time division scanning basis. As distinguished from the passive fault filters of the prior art, the Scanners are active elements, and in that regard the fault line itself now carries direct current which is required for powering the Scanners. The power is supplied by the Fault Line Regulated DC Current Driver 26 shown at the left hand end of the line, and this driver is fabricated using standard techniques normally associated with making what is essentially a power supply component.

At the other end of the fault line there is a DC and impedance balancing Line Termination Unit 27 which is also is a standard communications system line terminating device. Additionally shown in FIG. 2 is a Modem 28 which permits interconnection of a Scanner Controller Microprocessor 29 with a large number of fault lines 11A through 11N through transformers 30 each of which has its secondary in series with a condenser 31 used solely for the purpose of blocking DC from the transformer winding. Between the Modem and the fault lines are the normally utilized amplifier/wave shaper/band pass filters 32 and 33, which are also standard devices used in communications work. A Test Signal Generator 34 is connected to the communications line 10 and inserts a test pattern as determined by microprocessor control.

The Scanner Controller 29 and Test Signal Generator 34 are controllable from a Control Console 35 through an Executive Microprocessor 36 which also directs other Scanner Controllers 37 and 38. It is important to note at this point that the Test Signal Generator 34 is a secondary testing device, and in fact is not necessary except for certain specific tests to be subsequently described. The system according to the invention normally carries out fault testing by utilizing live traffic data which is present on the communication line.

The manner in which the system works is as follows. The Scanner Controller Microprocesser 29 communicates with "N" fault lines through the Modem 28 on a time division multiplexing basis, so that for example at a given instant it is directing all of the Scanners on fault line 11A to monitor all of the regenerators on span line pair 10-1. Having actuated the Scanners 23, 24, 25 on fault line 11A to their monitoring state for line pair 10-1 on the monitored span line 10, the Scanner Controller Microprocessor 29 then switches to fault line 11B and directs the Scanners on line 11B to examine the regenerators on a specific line pair in the span line which line 11B is monitoring. The Scanner Controller Microprocessor 29 then switches to fault line 11C, and so on down through all of the fault lines which it is controlling. During the time interval when the Scanner Controller Microprocessor was sequentially instructing the Scanners on the various fault lines 11 to monitor the regenerators on the associated line pairs, all of those Scanners which had already been so instructed had started the process of collecting data from the regenerators on the line pair that they were monitoring.

The Scanner Controller Microprocessor, once having completed its instructions to the Scanners on all of the fault lines, then returns to line 11A and first instructs the Scanners 23, 24, 25 on that line to terminate their data collection and then instructs the Scanners to report the error conditions, if any, which they have accumulated during that time interval from line pair 10-1. When the Scanner Controller Microprocessor requests that the Scanners on line 11A report the error conditions detected, it really requests a report only from the first and the last Scanner on that line. The reason for this is that while at any given instant in time, the Scanner is examining traffic moving in one direction along the line, it is not possible to tell which direction that is at that given time. At another time during this process, it will be examining traffic in the other direction. Accordingly, since it is not known which direction the traffic is travelling, it is necessary to examine both the first Scanner and the last Scanner, so that in effect, it is the last Scanner on the line that is being examined irrespective of which direction the traffic might be going. If the error counts which are reported do not exceed certain preset limits, then effectively there is a decision made that the regenerators are in satisfactory operating condition.

For example, for T1 carrier conditions live traffic is continuously monitored by an error counter in each Scanner for 6.4767 seconds, which is the time for transmission of $10^6$ bits. This technique allows rapid identification of marginal transmission conditions as well as hard failures. The error count indicates the ongoing ability of a repeater and Span line section to regenerate pulses. Continuous monitoring of live traffic for excessively high error rates identifies marginal repeaters or Span line sections. For example, one error in $10^8$ pulses is considered good transmission; however, if the transmission degrades to one error in $10^5$ pulses, data transmission is no longer possible. If the transmission deteriorates to one error in $10^3$ pulses, voice transmission is no longer possible. For other T-carrier conditions the time interval will be generally shorter, and the acceptable error counts will be different.

When the Scanner Controller 29 receives the data from the Scanners, on for example line 11A, it tests the data received by considering the data from the first and the last Scanners and makes decisions in accordance with how that data is interpreted. The several types of data and decisions made based on such data are shown in CHART 1 which illustrates tests for error conditions and also for activity, these tests being carried out during the same examination time.

The activity test utilizes a signal which is placed on the line to insure that activity is being maintained on the line in the absence of normal traffic.

CHART 1

| | 1st Scanner | last Scanner | Faulty Regenerator | Subroutine | Alarm |
|---|---|---|---|---|---|
| 1. | <threshold | <threshold | None | None | No |
| 2. | >threshold | >threshold | assume 1st | None | 1st |
| 3. | <threshold | >threshold | last (forward traffic implied) | work backward from last | subroutine & alarm |
| 4. | >threshold | <threshold | 1st (reverse traffic implied) | work forward from 1st | subroutine & alarm |

If overflow count is registered, that implies a free running or oscillating repeater the identity of which is determined by the subroutine.

ACTIVITY TEST

| | 1st Scanner | last Scanner | Faulty Regenerator | Subroutine | Alarm |
|---|---|---|---|---|---|
| 1. | activity | activity | — | None | No |
| 2. | no activity | no activity | Assume 1st | None | 1st |
| 3. | activity | no activity | last (forward traffic implied) | work backward from last | subroutine & alarm |
| 4. | no activity | activity | 1st (reverse traffic implied) | work forward from 1st | subroutine & alarm |

Having completed this process for fault line 11A the Scanner Controller then carries out in sequence the same process as it did with the fault line 11A Scanners in connection with each of the fault lines in the "N" fault line group. Subsequently to completing that operation, the Scanner Controller then repeats this entire process over again, instructing each of the Scanner groups on the specific lines of the "N" fault lines to then examine the conditions on a different pair of lines in the particular span line with which they are associated. For example, Scanners 23, 24 and 25 would then normally be instructed to monitor span line pair 10-2 (shown in FIG. 4). It then continues this process until it has completed examination of all of the line pairs in all of the span lines, and having done that, then starts a new cycle of examination and repeats this process on a continuous basis.

What has just been described is the normal scanning operation of the system. However, it is possible for the Executive Microprocessor 36 to determine that it desires to see the data upon which a particular piece of error information was based, and it can send a directive back to a particular Scanner Controller to have that Scanner Controller instruct the Scanners on a specific fault line, say fault line 11G, to collect the data from a particular pair of lines in its associated span line, and to then take that data and route it back through the Scanner Controller to the Executive Microprocessor 36 for data display and examination. During the time that this process is going on, the Scanner Controller is also carrying out its normal directing processes with regard to the remainder of the fault lines in the "N" fault line group. When this particular operation is completed, the Scanner Controller normally brings that fault line back into the normal controlled process in step with what is happening in the remainder of the fault lines in that group. However, where it appears that there is a problem, and when such has been verified by utilizing the semi-automatic mode just described by checking again with live traffic, it may then be decided to take the traffic off of the line and run the test generator signals through in the manual mode to stress the line and specifically pick up exactly where the problem is and then dispatch personnel to correct it.

System testing by use of the Test Signal Generator 34 is carried out under control of the Executive Microprocessor 36, and in this mode line traffic must be taken off of the communication line. The purpose of using the Test Signal Generator is to generate certain tests which cannot be done utilizing line traffic information on the communication line. These tests are for example, testing for bi-polar violations and for logic violations, and also for carrying out what may be termed stress testing. The Test Signal Generator 34 is activated to generate a particular known sequence of signals, and the Scanners are instructed to look either for bi-polar violations or for logic errors. Since the test signal is a known pattern, the Scanners are able to determine when variations from that known pattern have occurred, and can therefore determine whether any errors have occurred. In order to be certain that there have been no bi-polar violations and no logic errors, the returning error count from the Scanners should be zero.

A slightly different situation exists with regard to stress testing. In this situation the Test Signal Generator deliberately puts out a signal which does contain bi-polar violations, and the number of violations is therefore known ahead of time. In order to determine whether the regenerators are functioning properly, the Scanners will then count the number of bipolar violations, and if that number of violations agrees with what is built into the test signal pattern, then it is clear that the regenerators are functioning properly under that condition of induced signal stress. If the number of error counts differs from that which is expected, then there is at least one regenerator which is malfunctioning. Illustrations of the occurrence of these types of error conditions are shown in waveforms diagram FIG. 7, to which reference should be made.

The first line shows logic error testing in which a signal sent from the test generator consists of a pattern of alternating ones and zeros. As shown on the first line, each signal time, or clocktime, is two pulse times wide, so that the first interval constitutes a "one" showing a pulse which appears in half of the clocktime period. The next interval is a "zero" because there is no pulse in that interval. The third interval is a "one" because there is a pulse even though poled in the opposite direction. It is the presence of a pulse, irrespective of its polarity, which determines whether there is a one. The second line shows a regenerator output in which the first "one" is reproduced accurately, but in the second pulse time where there should be a zero the regenerator has produced a "one", and that is a logic error. In the third period the regenerator produces a "one" which is correct, although it is of the opposite polarity. The fourth period produces a proper zero and the fifth a proper "one". Thus, whereas the regenerator should have produced alternating "ones" and "zeros" in accordance with the test signal which has been sent, instead it has produced at the outset a series of three "ones", and this is a logic error.

The waveform on the third line is an illustration of a bipolar violation. Comparing the third waveform with the initial test signal waveform it is apparent that the second pulse is poled up instead of down, and consequently is not the same as the signal which was sent. The problem with the bipolar violation is that it causes a tendency to establish a DC bias level on the line which may seriously affect the ability of the subsequent repeaters to properly reconstruct the signal on the line. Consequently the reason for sending the signals in alternating polarities is to maintain a neutral level on the line.

In the stress testing mode three different test signals are sent to stress the line. The first one shown is the MEAS 1 signal which is 1024 positive triplets consisting of two positive pulses and one negative pulse between the two positive pulses, the triplets being separated by a time interval which can be made variable. The variability in the spacing constitutes the density control which was previously mentioned in connection with the Test Generator 34 as being a function controlled from the Control Console via the Executive. These 1024 positive triplets are then followed by 1024 variably set negative triplets. This test signal in effect forces bipolar violations because the first positive triplet should normally be followed by a negative triplet, but when it is followed by another positive triplet there is necessarily a bipolar violation. Consequently there should occur 2046 bipolar violations at the end of the MEAS 1 test. The Counter is checked to see if that number of bipolar violations have been registered. If they have not, the unit is not functioning properly.

The second test is the MEAS 2 signal as shown, and this is a series of 2048 positive triplets and is a check for the positive sensitivity of the repeater. This provides a positive biasing on the line, and the check is again for bipolar violations. The third test is the MEAS 3 test and is a sequence of 2048 negative triplets which are testing for negative sensitivity of the repeater, again biasing the line, but this time in the opposite polarity sense.

Figure 3:
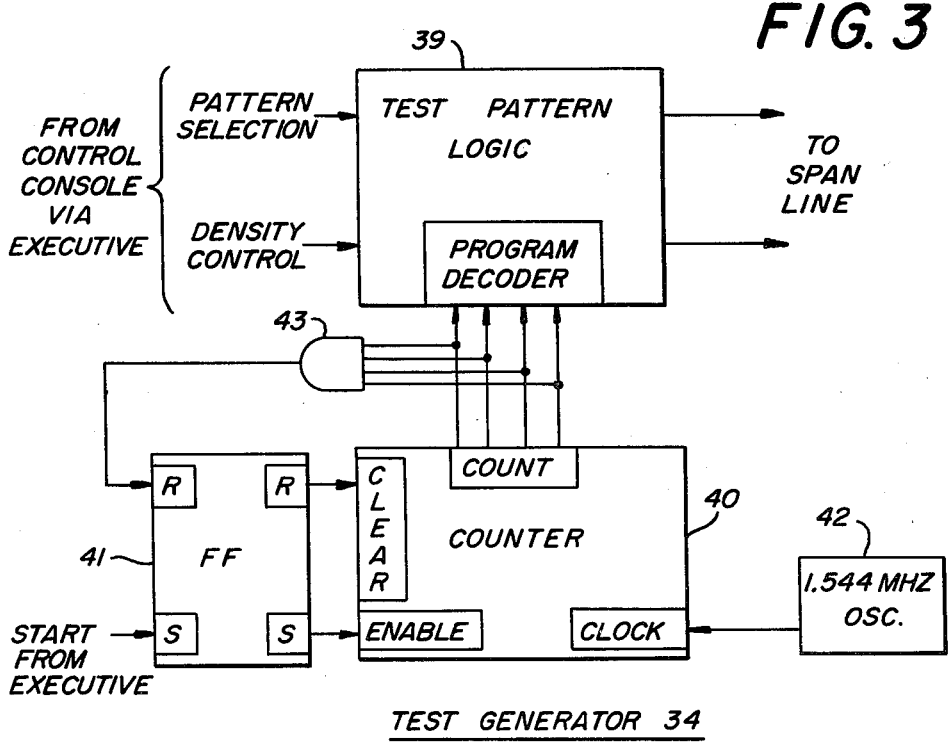
FIG. 3 is a logical block diagram of a test signal generator as shown in FIG. 2.

A Test Signal Generator 34 typically could be as shown in FIG. 3 to which reference should be made. A Test Pattern Logic Box 39 is shown which generates the particular test pattern sequences that are desired. The particular pattern desired from amongst those available from the logic is selected by the operator from the Control Console through the Executive Microprocessor, and the pattern rate or density is also selected by the operator. The actual initiation of the test signal pattern onto the span line is controlled by the Counter 40 which is in turn controlled from the Executive Microprocessor through a Flip-Flop 41.

A 1.544 megahertz oscillator 42 (or whatever frequency is desired) puts pulses into the clock input of the Counter but no count is registrable in the Counter until the Enable input receives a signal from the Flip-Flop 41. The enabling signal from the Flip-Flop is generated by a START signal received from the Executive Microprocessor, but this START signal is not generated by the Executive until the Executive, through the Scanner Controller, has already instructed the Scanners on a particular fault line to monitor the traffic or information on a particular span line pair, and to thereafter report that information back to the Control Console through the Scanner Controller and the Executive.

When all of the selection mechanisms are in place and the system is ready to function for a test the Executive Microprocessor then generates the START signal which through the Flip-Flop 41 generates an Enable signal to the Counter 40 and allows the clock pulses from the Oscillator 42 to start the count in the Counter. As the count goes on, the output of the Counter is routed to a Program Decoder in the Test Pattern Logic 39 so that whatever test signals are desired in a given sequence are generated in accordance with the particular count which then exists in the Counter. This of course provides an automatically sequencing test pattern program to be sent out over the span line.

When a particular predetermined count is reached in the Counter, that count, through a Decoder Gate 43, presents a signal to the reset input to the Flip-Flop 41 triggering it and terminating the Enable signal to the Counter 40 and simultaneously clearing the counts stored in the Counter to prepare for the next cycle, whenever it is initiated. The particular Test Pattern Logic 39 may be any that is desired, and may be any suitable configuration for generating the pulse pattern shown in the waveform diagram of FIG. 7.

Figure 4:
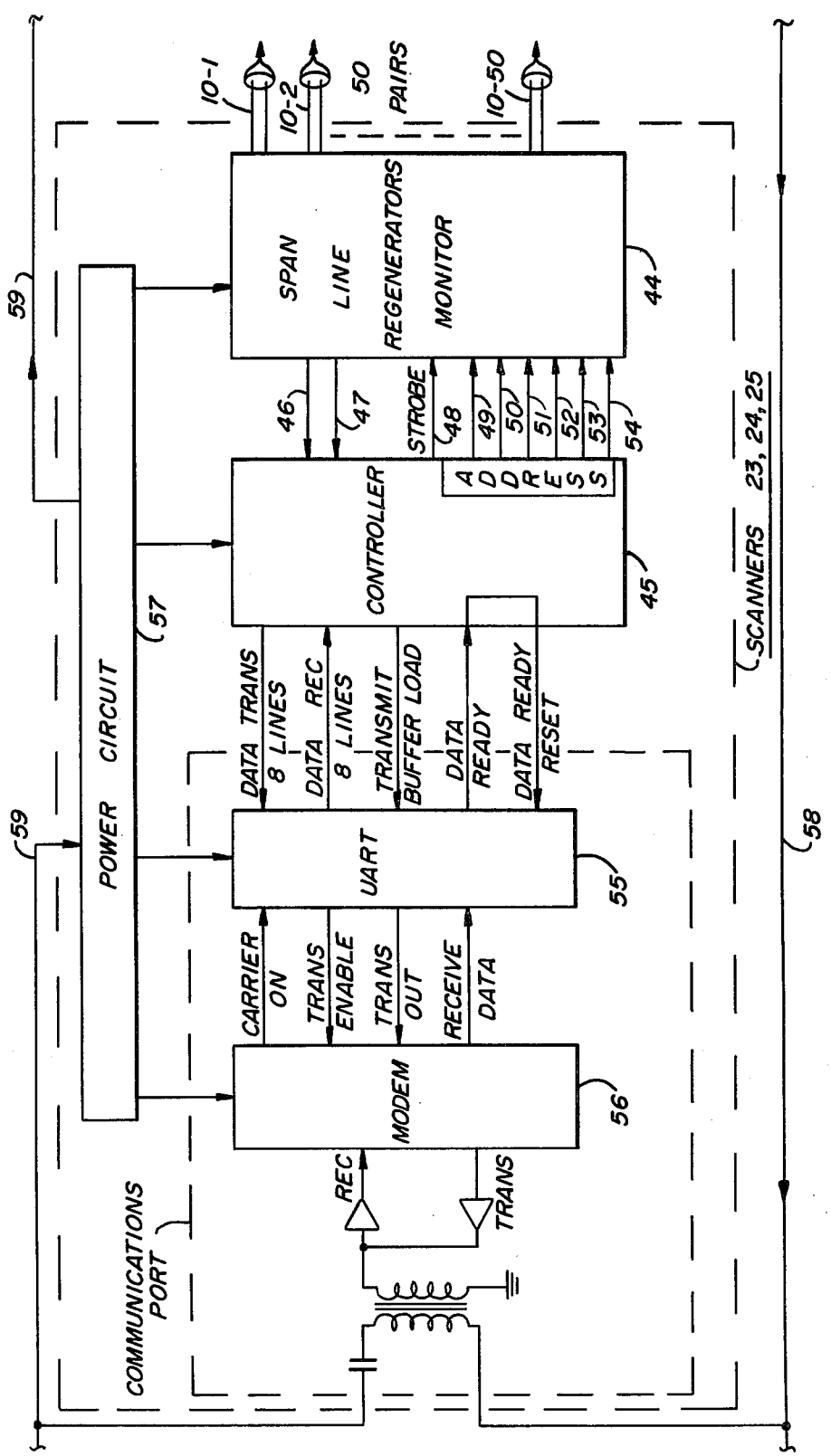
FIG. 4 is a functional block diagram of a Scanner according to the invention as shown in FIG. 2.

FIG. 4 shows in functional block form the interior configuration of each of the Scanners in the T-carrier system according to the invention. These include a Spanline Regenerators Monitor 44 which is connected to the fifty pairs of lines in each span line and which is selectively connectible to one pair at a time under control of a Controller 45. The information received through the Monitor 44 by the Controller 45 is then processed to determine whether or not there are present any of the types of errors previously discussed. The information received by the Controller from the Monitor comes via the two lines 46, 47 whereas the instructions from the Controller to the Monitor to determine which pair of lines in the span line is to be examined, is carried by the STROBE line 48 and the six address lines 49 to 54 which operate the selection point in a matrix. The Controller 45 examines for and stores error counts over a predetermined length of time which has been decided upon by the Scanner Controller. At the end of the predetermined error counting time the Scanner Controller instructs the Scanner to stop counting and relay the error count information back to the Scanner Controller.

The data in the Controller for transmission back to the Scanner Controller is transmitted in parallel digital form from the Controller 45 to a UART 55 (Universal Asynchronous Receiver Transmitter). The UART 55 then converts the parallel information to serial digital form and transfers that to the Modem 56 which in turn converts the serial digital data to serial FSK, or frequency shift keying data. This data is in the form of a set of two tones, which is required for transmission purposes because the line over which it transmits back to the Scanner Controller is only a voice quality line and is therefore frequency limited. The reverse process takes place when the Scanner Controller desires to have the Scanner carry out a particular task. It sends information to the Scanner in the FSK mode, and that is then transferred through in the reverse direction just described. The Modem 56 and UART 55 are standard well-known devices and the Modem could be for example a Motorola 14412 integrated circuit chip while the UART could be for example an Intersil 6402 integrated circuit chip. The Modem and UART function in their normal manners and need not be further described.

The Span Line Regenerators Monitor 44 is basically an electronic crossbar device which selects the particular pair of the fifty pairs of lines which it is desired to connect to the Controller under the control of the Controller. When the selection has been made, the particular pair of the fifty pairs is connected to the two line data communication line 46, 47 between the Span Line Monitor and the Controller so that whatever information is appearing on that particular pair is transmitted to the Controller. Any ordinary type of switching network desired may be used for this particular function, as for example the electronic line selection systems presently used in telephone central office equipment. Accordingly, the Monitor will not be described in specific circuit configuration detail.

The Scanner Power Circuit 57 is series fed from the DC Current Driver 26 via the fault line and develops the particular voltages needed for operating the Scanner. The use of a constant current power source permits the series connection of the power circuits of all the Scanners on a line, and effectively avoids the condition of a very low impedance circuit being bridged across the communication line pair 58/59 of the fault line, which would seriously impair the ability to send communication data along that line to each of the Scanners. The power circuits are effectively a reasonably high impedance since they all appear to be in series across the line. There is incorporated into the power circuit of each Scanner a backup diode system such that if the primary power circuit for that particular Scanner should fail, the power to the remaining scanners on the line is not interrupted. This of course results in the nonfunctioning condition of that particular Scanner, and that is determinable by the Scanner Controller upon proper interrogation.

Figure 5:
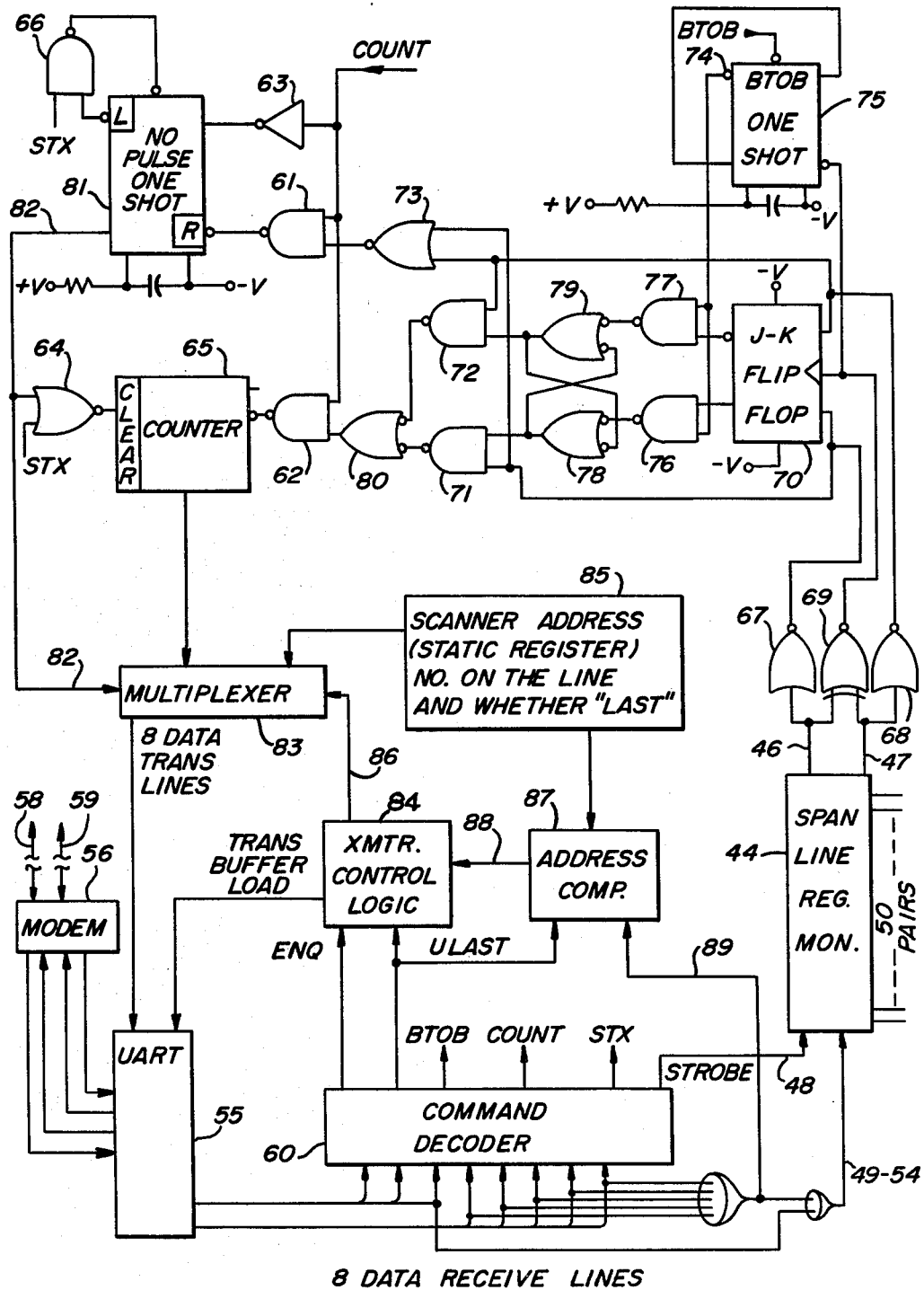
FIG. 5 is a functional and logical block diagram showing most of the elements shown in FIG. 4 but with the logic elements of the Controller shown in more detail.

The manner in which the Controller 45 functions to render the Scanner operative is described in conjunction with an examination of FIG. 5 to which attention should now be directed. A command is transmitted from the Scanner Controller, say 29, which passes in the normal way through the Modem 56 and the UART 55 where, in the UART, it is transformed from serial to parallel digital form and is read out over the eight data receive lines to the Command Decoder 60 of the Scanner, and the six lines which contain the Span Line Monitor address information for determining which of the fifty pairs in the span line is to be selected are also routed to the Span Line Monitor 44 together with a STROBE signal from the Command Decoder 60. The STROBE signal determines the time at which the span line pair address is rendered effective to select the particular span line pair which it is desired to monitor.

The Command Decoder generates five other signals which are shown as the ENQ or enquire signal, the ULAST signal, the BTOB, the COUNT and the STX signals. The next bit of information that comes in over the UART Data Receive lines to the Command Decoder causes the generation of the COUNT and the STX signals. The COUNT signal goes to a pair of inverter "and" gates 61 and 62 and an inverting amplifier 63, while the STX signal goes to an inverting "or" gate 64 whose output goes to the CLEAR input of a Counter 65, the STX signal also going to an inverting "and" gate 66 which is associated with a "no pulse" detector circuit.

When the Span Line Monitor 44 was caused to be connected to a particular one of the fifty pairs of lines in the span line, the data on that line started to feed through the Monitor 44 and to the pair of output lines 46, 47. There appears an output on one of the Monitor output lines 46 if the monitored data is a positive pulse and there appears an output on the other of the Monitor output lines 47 if the monitored data is a negative pulse. These particular data, whichever they are, are passed respectively through inverting buffers 67 and 68 and are also both inserted to the separate inputs of an exclusive "nor" gate 69. The outputs of these buffers and the exclusive "nor" gate are routed to a JK flip-flop 70 and are also routed to two inverting "and" gates 71 and 72 and to an inverting "or" gate 73.

Assuming for the time that there is no BTOB signal coming from the Command Decoder 60, the signal at the terminal 74 of the One-Shot 75 is such that the inverting "and" gates 76 and 77 are both enabled and the circuit will check for bi-polar violations as follows. The output developed by the JK flip-flop 70 in accordance with the signals that it was receiving from the Span Line Monitor 44 are transferred directly to the flip-flop formed by the cross-coupled "nor" gates 78 and 79. Having established a particular state from the flip-flop which sets the conditions on the inverting "and" gates 71 and 72 these gates are now in condition to compare that signal state with the next bit of information coming in from the Span Line Monitor. If both inputs are the same polarity on a given gate it indicates that there have been two successive pieces of information of the same polarity, and since what is being tested for is a bi-polar violation, such two successive bits would constitute a violation and consequently the output then from either of these gates is passed through the "or" gate 80 to the "and" gate 62 which has been enabled by the presence of the COUNT SIGNAL from the Command Decoder 60. Accordingly, this count passes into the Counter 65 where it is registered as an error count.

Simultaneously with the examination and counting which has just been described, the input pulse data coming through the buffers from the Span Line Monitor is also routed to and through inverting "or" gate 73 and through enabled "and" gate 61 to a retriggering input R of One-Shot 81. The One-Shot 81 had previously been initialized by the STX signal pulse generated by the Command Decoder 60 which started the One-Shot on its timing cycle by removing the latch signal L. As long as the pulses are presented to the One-Shot 81 at its retriggering input, the One-Shot can not time out and a "no pulse" output indication is not generated on output line 82. If the One-Shot 81 reaches the end of its preset time period without having received a retriggering pulse, then it times out, generates a latching signal at its output L which renders the One-Shot insensitive to signals at its retriggering input, and produces a "no pulse" output on line 82 which is transmitted to the inverting "or" gate 64 which in turn passes it through to the Counter 65 and clears the count. The Counter had of course been initially cleared to its zero state by the STX signal generated by the Command Decoder.

Since the "no pulse" output of the One-Shot 81 remains once it has occurred, it is not possible for any further data coming in across the Span Line Monitor to cause counts to accumulate in the Counter. Whatever counts would tend to be accumulated are overridden by the "no pulse" signal from the One-Shot 81. Consequently at a later time when the Counter is interrogated as to its count, it will always send back a zero count, which together with the presence of the "no pulse" signal at the Multiplexer 83 indicates a "no activity on the line" condition as distinguished from a "no error" count, which could be detected if the count in the Counter were zero but there were not present the "no pulse" signal.

In the manual mode of logic error testing using a test signal generator such as 34, a test signal consisting of alternating "ones" and "zeros" is applied to the span line under test and the Scanners are instructed to monitor the regenerators of that span line in the "Back-to-Back" or BTOB mode, and the Command Decoder 60 generates the BTOB signal. Should the Scanner detect a "one" where a "zero" should be in the test pattern, it will log a logic error count in its Counter 65. The monitoring circuit operates as follows, and waveforms illustrating this operation are shown in FIG. 8. The first line shows the regenerator signal into the Scanner, and the last line shows the pulse out of "or" gate 80 to the error Counter 65, the other lines showing the signals out of the other gates, flip-flops and one-shot which form the circuit.

With the BTOB signal present the BTOB one-shot 75, is set for a pulse output duration equal to one and one-half (1.5) bit times, and is triggered by the leading edge of the clock pulses generated by the exclusive NOR gate 69. The JK flip-flop 70 is clocked on the trailing edge of these same clock pulses. The One-Shot 75 thus delays the setting of the state of the J-K flip-flop into the cross-coupled gate flip-flop 78 and 79 by one complete bit time after the actual change of state of the J-K flip-flop. The cross coupled flip-flop outputs from 78 and 79 respectively are gated through "and" gates 71 and 72 with the positive and negative pulse outputs from buffers 67 and 68 of the Span Line Regenerators Monitor 44 to "or" gate 80. The delay of the J-K flip-flop forces the cross coupled flip-flop to stay in the previous state for one-half bit time into the bit time following a bit time containing a "one" in the test pattern. Since the next bit time in the test pattern contains a "zero", no pulses are gated with the outputs of the cross coupled flip-flop. A regenerator in the span line being monitored that is inserting "one's" into the places where the test pattern contains zeroes will cause a Scanner input pulse to be gated with the cross coupled flip-flop through "and" gate 71 or 72 and "or" gate 80, and a logic error count will be logged into the Counter 65.

The counting that has been ordered continues until a new command is received through the UART from the Scanner Controller which in effect says "stop counting". This terminates the COUNT signal, and the BTOB signal if there had been one. The Scanner Controller then sends a message which is decoded by the Command Decoder 60 to generate the ULAST signal which is routed to the Transmitter Control Logic 84. The Scanner Address block 85 which is a static register, has stored in it whether it is the last scanner on the line or whether it is not, as well as its number on the line. This information is always available to the Multiplexer 83 but is not transmitted through the Multiplexer except in response to a specific signal received from the Transmitter Control Logic 84 on line 86.

When a ULAST signal is decoded by the Command Decoder 60 it is simultaneously presented to the Transmitter Control Logic 84 and to the Address Comparator 87. The Address Comparator now looks for an indication from the Scanner Address static register as to whether or not in fact this Scanner is the last Scanner. If it is, a comparison signal will be generated which is routed to the Transmitter Control Logic on line 88 and causes the enabling signal to be sent out over line 86 to the Multiplexer, and thereafter causes the Scanner Address Register 85 to read out through the Multiplexer 83 to the UART 55. It identifies itself as the last Scanner on the line, and also reads the count information out of the Counter 65 through the Multiplexer 83. For all of the Scanners which are not the last scanner on the line while the ULAST signal is generated, the Address Comparator will not find a match and therefore these Scanners will not be enabled to read out their data through the Multiplexer.

The Scanner Controller will then make inquiry as to which Scanner is the number one scanner, and in response to this, the Command Decoder generates the ENQ or inquiry signal which is routed to the Transmitter Control Logic. This address for the number one scanner is also routed over to the Address Comparator 87 from the data receive lines via cable 89 so that the Scanner that is the number one Scanner will find a match in the Address Comparator which will again function as previously described. It will produce an output on line 88 which together with the ENQ signal will cause the Transmitter Control Logic to generate an enabling condition on line 86 to the Multiplexer, and cause the Scanner to identify itself and read out its count data. An inquiry as to any other Scanner, say the number four Scanner, is responded to in the same way as for the number one Scanner. Under all of these conditions, whether it was a ULAST or an actual requested scanner by number identity, a Transmitter Buffer Load signal is also generated by the Transmitter Control Logic 84 to the UART 55.

The Scanner Address device can be any kind of static register unit which is desired, and the Address Comparator is of course a well known device in the art, as is the Multiplexer. The Command Decoder is any suitable type of decoding matrix in which specific combinations of input signals generate specific combinations of output signals. The Transmitter Control Logic is a simple well-known type of logic in which the receipt of the necessary signals such as the ENQ signal or the ULAST with the address comparison signal causes the generation for a predetermined length of time, and at specific times, of the signals necessary to permit the Multiplexer to read data through it and to transfer that data into the UART. Circuits of this type are old in the art.

Figure 6:
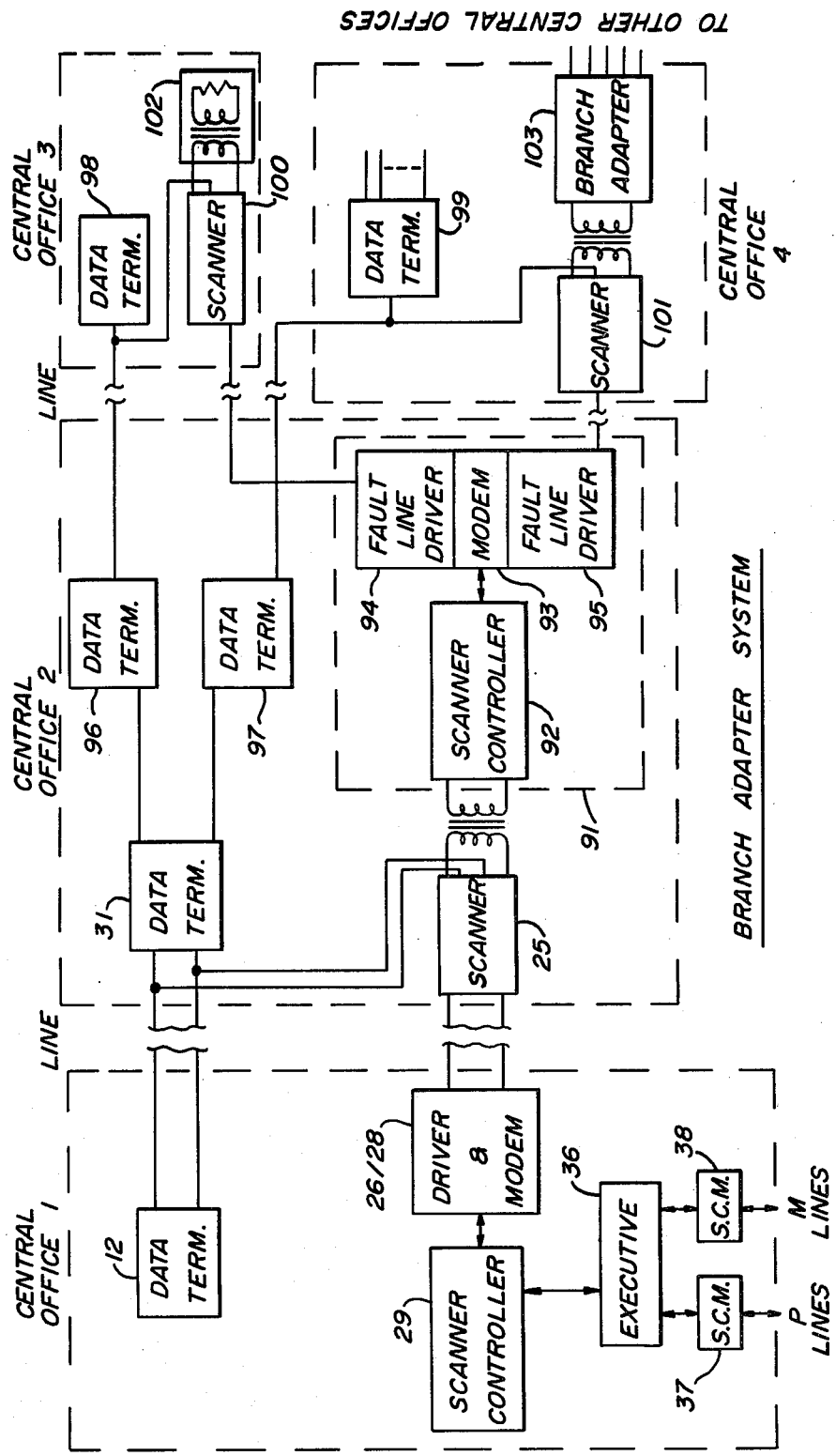
FIG. 6 is a functional block diagram of an extended form of the invention utilizing branch adapters.

FIG. 6 illustrates in functional block form the extension of the monitoring system by what is known as the Branch Adapter system. In this system the terminating resister 90 shown as part of the impedance line termination 27 for the final Scanner 25 in Central Office 2 of FIG. 2 is removed and is replaced by a unit 91 which is designated as a Branch Adapter. This Branch Adapter 91 includes within it a Scanner Controller 92, a Modem 93 for communicating with other fault lines, and Fault Line Drivers 94 and 95 for the additional fault lines illustrated under the control of this Branch Adapter.

At Central Office 2 the system is illustrated as dividing into two through Data Terminals 96 and 97 for continued routing out to Central Offices 3 and 4, to Data Terminals 98 and 99 respectively. However, it is to be understood that this branching could be extended to many more central offices as desired. It is seen that these fault lines connecting Central Office 2 with Central Offices 3 and 4 have their own Fault Line Drivers 94 and 95 which power the Scanners on the associated fault line, such as the terminating Scanners 100 and 101 at Central Offices 3 and 4 respectively. At Central Office 3 the fault line is shown as terminating in a Line Termination unit 102, while at Central Office 4 the fault line final Scanner 101 is shown as driving another Branch Adapter 103 which controls further subdivision of the system. The extension of this system into an expanding network is limited only by the hardware memory capabilities of the Executive 36 back at Central Office 1.

The Executive 36 controls all of the Scanner Controllers in the Branch Adapters through the Scanner Controller at Central Office 1, and interrogates and collects data for each of the various branches in the same manner as has already been described in connection with the other figures. The great advantage of this aspect of the invention is that in normal telephone practice in order to carry out the kinds of testing that have previously already been described, it would be necessary to transport testing equipment from one central office to another, whereas in the system according to the invention this is not necessary because all of the remote central offices can be monitored from one location, namely Central Office 1 where the Executive 36 is located. This effects great savings in time expended by test personnel in going from one place to another, and also greatly speeds up the availability of test data from remote locations.

The Scanner Controller 29 at Central Office 1 uses different sets of frequencies to communicate with the Scanners on the fault line which it is monitoring and to send messages to the other Branch Adapters down the line. Contained within the information that the Executive is sending to the Branch Adapters is information coded properly to direct the Branch Adapter to send the information to a particular fault line which that Branch Adapter is controlling. This situation is continued down the line so that if in fact the message is intended for a Branch Adapter five levels removed, it will eventually get there through the same sorting process.

Each Branch Adapter therefore retains that part of the information from the Executive which relates to the fault lines which it is controlling, and passes on the rest of the message to the more remote Branch Adapters for their use.

What is claimed to be new and useful is:

1. For use in conjunction with a pulse code modulation telecommunications system which comprises at least first and second data terminals located at spaced apart first and second central offices and having a data communications transmission line extending therebetween which includes in-line signal regenerators at spaced intervals therealong, a fault detecting system comprising in combination,
   (a) a fault line running parallel to said data communication transmission line including a separate data monitor means associated with each of said signal regenerators, each said data monitor means having a data signal input circuit and a bi-directional signal circuit, said data signal input circuit of said data monitor means being couplable to the data communication line at the output of the signal regenerator with which it is associated to thereby receive live traffic digital data signals from said data communication transmission line which have just been regenerated, and said bi-directional circuit being coupled to said fault line to receive instruction signals therefrom and to transmit digital data signals thereto, and
   (b) data monitor means control means couplable to said fault line and when so coupled being operative to transmit instruction signals selectively to each of said data monitor means coupled to said fault line and being operative to receive and process digital data signals transmitted to said fault line by said data monitor means.

2. A fault detecting system as defined in claim 1 wherein each of said data monitor means includes a switching network coupled to said data signal input circuit, said switching network having plural data input circuits and a single data output circuit, the said single data output circuit of said switching network being coupled to said data monitor means data signal input circuit, and said plural data input circuits of said switching network being each couplable to different data communication lines at the outputs of signal regenerators associated with said data monitor means, said switching network further including switching circuits responsive to instruction signals from said data monitor means control means to cause said switching network to couple its said single data output circuit to a selected one of its said plural data input circuits, whereby said data monitor means is able to monitor a plurality of signal regenerators in a plurality of communication lines by switching lines under control of said data monitor means control means.

3. A fault detecting system as defined in claim 1 further including a plurality of additional fault lines of the same kind as described in claim 1 and each of which is associated with a different one of a plurality of data communication lines, said data monitor means control means being selectively couplable to any of said fault line and said plurality of additional fault lines and, as aforesaid, being operative to transmit instruction signals selectively to each of said data monitor means coupled to a fault line and being operative to receive and process digital data signals transmitted by said data monitor means.

4. For use in conjunction with a telecommunication system which comprises at least first and second data terminals located at spaced apart first and second central offices and having a data communications transmission line extending therebetween which includes in-line signal regenerators at spaced intervals therealong, a fault detecting system comprising in combination,
   (a) a fault line running parallel to said data communication transmission line including a separate data monitor means associated with each of said signal regenerators, each said data monitor means having a data signal input circuit and a bi-directional signal circuit, said data signal input circuit of said data monitor means being couplable to the data communication line at the output of the signal regenerator with which it is associated to thereby receive data signals which have just been regenerated, and said bi-directional circuit being coupled to said fault line to receive instruction signals therefrom and to transmit data signals thereto, said data monitor means further including data processing means and processed data storing means coupled to its said data signal input circuit effective to process data signals received from the associated signal regenerator of the data communication line and store the processed data, and
   (b) data monitor means control means couplable to said fault line and when so coupled being operative to transmit instruction signals selectively to each of said data monitor means coupled to said fault line and being operative to receive and process data signals transmitted to said fault line by said data monitor means.

5. A fault detecting system as defined in claim 4 wherein said data monitor means further includes, readout means coupled to said processed data storing means and effective responsive to instruction signals from said data monitor means control means to transmit the stored processed data to the said fault line via the said bi-directional signal circuit.

6. A fault detecting system as defined in claim 4 wherein said data monitor means further includes,
   (a) data monitor means identification means operative responsive to instruction signals from said data monitor means control means to identify via the said bi-directional signal circuit the position along the fault line of the data monitor means of which it comprises a part, and
   (b) readout means coupled to said processed data storing means and effective responsive to instruction signals from said data monitor means control means to transmit the stored processed data to the said fault line via the said bi-directional signal circuit.

7. A fault detecting system as defined in claim 1 further including test signals generator means having a test signals output circuit couplable to a data communication line at one of the said first and second data terminals, and having generator means control circuits coupled to and controlled by said data monitor means control means, whereby said control means can select when said test signals generator means places test signals on the data communication line and can select the test signals pattern to be transmitted.

8. A fault detecting system as defined in claim 1 for use in a telecommunications system having at least a second data communications transmission line extending from a junction with the said first data communications transmission line, wherein said data monitor means control means is located at a first location on said fault line, and wherein said fault detecting system further includes,
(a) a second data monitor means control means coupled to said fault line at a second location along said fault line,
(b) at least a second fault line couplable to said second data monitor means control means, said second fault line running parallel to said second data communication transmission line and including second separate data monitor means associated with each signal regenerator of said second data communications transmission line, each said second data monitor means having a data signal input circuit and a bi-directional signal circuit, said data signal input circuit of said second data monitor means being couplable to the said second data communication transmission line at the output of the signal regenerator with which it is associated to thereby receive data signals which have just been regenerated, and said bi-directional signal circuit being coupled to said second fault line to receive instruction signals therefrom and to transmit data signals thereto.

9. A plurality of fault detecting systems as defined in claim 1 further including supervisory control means coupled to the said data monitor means control means of each said fault detecting system for two way communication therewith, whereby said supervisory control means can transmit instruction signals to and receive data signals from all of said plurality of fault detecting systems.

10. A fault detecting system as defined in claim 2 wherein said data monitor means coupled to a fault line are plural and wherein the said plural data input circuits of all of said switching networks are so couplable to a plurality of communication lines that all of said data monitor means are couplable to different signal regenerators in the same communication line when switched from line to line under control of said data monitor means control means.

11. A fault detecting system as defined in claim 2 further including a plurality of additional fault lines of the same kind as described in claim 1 and each of which is associated with a different one of a plurality of data communication lines, said data monitor means control means being selectively couplable to any of said fault line and said plurality of additional fault lines and, as aforesaid, being operative to transmit instruction signals selectively to each of said data monitor means coupled to a fault line and being operative to receive and process digital data signals transmitted by said data monitor means.

12. A fault detecting system as defined in claim 2 wherein said data monitor means further includes,
(a) data processing means and processed data storing means coupled to its said data signal input circuit effective to process data signals received from the associated signal regenerator of the data communication line and store the processed data, and
(b) readout means coupled to said processed data storing means and effective responsive to instruction signals from said data monitor means control means to transmit the store processed data to the said fault line via the said bi-directional signal circuit.

13. A fault detecting system as defined in claim 3 wherein at least some of said plurality of data communication lines extend to different central offices, each such line being accompanied by one of said plurality of additional fault lines.

14. A fault detecting system as defined in claim 3 wherein said data monitor means further includes,
(a) data processing means and processed data storing means coupled to its said data signal input circuit effective to process data signals received from the associated signal regenerator of the data communication line and store the processed data,
(b) data monitor means identification means operative responsive to instruction signals from said data monitor means control means to identify via the said bi-directional signal circuit the position along the fault line of the data monitor means of which it comprises a part, and
(c) readout means coupled to said processed data storing means and effective responsive to instruction signals from said data monitor means control means to transmit the stored processed data to the said fault line via the said bi-directional signal circuit.

15. A fault detecting system as defined in claim 4 wherein said data processing means comprises logic error detecting means operative to detect logic errors in the data signals received from the data signal input circuit and to generate an error signal when a logic error is detected.

16. A fault detecting system as defined in claim 4 wherein,
(a) said data processing means comprises logic error detecting means operative to detect logic errors in the data signals receives from the data signal input circuit and to generate a discrete error signal upon the detection of each logic error, and
(b) said processed data storing means comprises counting means operative to register a count in response to the generation of each discrete error signal.

17. A pulse code modulation fault detecting system as defined in claim 4 wherein said data processing means comprises bipolar violation detection means operative to detect bipolar violations in the data signals received from the data signal input circuit and to generate an error signal when a bipolar violation is detected.

18. A fault detecting system as defined in claim 4 wherein,
(a) said data processing means comprises bipolar violation detecting means operative to detect bipolar violations in the data signals received from the data signal input circuit and to generate a discrete error signal upon the detection of each such violation, and
(b) said processed data storing means comprises counting means operative to register a count in response to the generation of each discrete error signal.

19. A fault detecting system as defined in claim 5 further including test signals generator means having a test signals output circuit couplable to a data communication line at one of the said first and second data terminals, and having generator means control circuits coupled to and controllable by said data monitor means control means, whereby said control means can select when said test signals generator means places test signals on the data communication line and can select the test signals pattern to be transmitted.

20. A fault detecting system as defined in claim 8 wherein,
   (a) said data monitor means control means is located at one of the said first and second central offices,
   (b) said second data monitor means control means is located at the other of the said first and second central offices, and
   (c) said second data communication transmission line and said second fault line extend to a third central office.

21. A fault detecting system as defined in claim 8 further including a second plurality of additional fault lines of the same kind as described in claim 1 and each of which is associated with a different one of a second plurality of data communication lines, said second data monitor means control means being selectively couplable to any of said second fault line and said second plurality of additional fault lines and, as aforesaid, being operative to transmit instruction signals selectively to each of said second data monitor means coupled to a fault line and being operative to receive and process data signals transmitted by said second data monitor means.

22. A fault detecting system as defined in claim 8, 21, or 26 wherein said data monitor means control means supervises the activity of said second data monitor means control means by instruction signals transmitted along said fault line.

23. A fault detecting system as defined in claim 10 wherein said data monitor means further includes,
   (a) data processing means and processed data storing means coupled to its said data signal input circuit effective to process data signals received from the associated signal regenerator of the data communication line and store the processed data, and
   (b) readout means coupled to said processed data storing means and effective responsive to instruction signals from said data monitor means control means to transmit the stored processed data to the said fault line via the said bi-directional signal circuit.

24. A fault detecting system as defined in claim 11 wherein said data monitor means further includes,
   (a) data processing means and processed data storing means coupled to its said data signal input circuit effective to process data signals received from the associated signal regenerator of the data communication line and store the processed data, and
   (b) readout means coupled to said processed data storing means and effective responsive to instruction signals from said data monitor means control means to transmit the stored processed data to the said fault line via the said bi-directional signal circuit.

25. A fault detecting system as defined in claim 16 wherein said data processing means further comprises a no-pulse detector which detects an absence of signals from the data signal input circuit, and in response to detection of such condition jams the said counting means to a zero count state.

26. A fault detecting system as defined in claim 21 wherein at least some of said second plurality of data communication lines extend to different central offices, each such line being accompanied by one of said second plurality of additional fault lines.

27. A fault detecting system as defined in claim 21 wherein,
   (a) at least some of said second plurality of data communication lines extend to different central offices, each such line being accompanied by one of said second plurality of additional fault lines, and
   (b) at least one of said different central offices there is a further system extension to another central office, said further system extension including a further data monitor means control means and a further data communication line and a further fault line of the same kind as and interrelated as described in claim 1.

* * * * *